US010060726B2

(12) United States Patent
Liu et al.

(10) Patent No.: US 10,060,726 B2
(45) Date of Patent: Aug. 28, 2018

(54) PARALLEL IMAGE MEASUREMENT METHOD ORIENTED TO THE INSULATING LAYER THICKNESS OF A RADIAL SYMMETRICAL CABLE SECTION

(71) Applicant: SHANGHAI UNIVERSITY OF ENGINEERING SCIENCE, Shanghai (CN)

(72) Inventors: Xiang Liu, Shanghai (CN); Yunyu Shi, Shanghai (CN); Yongxiang Xia, Shanghai (CN)

(73) Assignee: SHANGHAI UNIVERSITY OF ENGINEERING SCIENCE, Shanghai (CN)

( * ) Notice: Subject to any disclaimer, the term of this patent is extended or adjusted under 35 U.S.C. 154(b) by 0 days.

(21) Appl. No.: 15/654,297

(22) Filed: Jul. 19, 2017

(65) Prior Publication Data

US 2018/0017375 A1    Jan. 18, 2018

Related U.S. Application Data

(63) Continuation of application No. PCT/CN2016/072495, filed on Jan. 28, 2016.

(30) Foreign Application Priority Data

Apr. 24, 2015    (CN) .......................... 2015 1 0197679

(51) Int. Cl.
G01B 11/06    (2006.01)
H04N 5/14    (2006.01)
H04N 5/372    (2011.01)

(52) U.S. Cl.
CPC ............. *G01B 11/06* (2013.01); *H04N 5/142* (2013.01); *H04N 5/372* (2013.01); *G06T 2215/16* (2013.01)

(58) Field of Classification Search
CPC . G01B 11/06; G06T 7/00; G08F 6/001; C08F 210/02; C08L 23/06; H01L 3/441;
(Continued)

(56) References Cited

U.S. PATENT DOCUMENTS 3,760,264 A  *  9/1973  Zumbach ............... G01B 7/105
                                                    324/230
5,329,133 A  *  7/1994  Uesugi .................. G01N 21/88
                                                    250/559.05

(Continued)

FOREIGN PATENT DOCUMENTS

CN    101206109    6/2008
CN    102032875    4/2011
(Continued)

OTHER PUBLICATIONS

International Search Report (Chinese and English) and Written Opinion of International Application No. PCT/CN2016/072495, dated Apr. 27, 2016, 13 pages.

*Primary Examiner* — Sang Nguyen
(74) *Attorney, Agent, or Firm* — Hamre, Schumann, Mueller & Larson, P.C.

(57) ABSTRACT

The present invention relates to a parallel image measurement method oriented to the insulating layer thickness of a radial symmetrical cable section. The method conducts the non-contact high-accuracy measurement based on the machine vision and the image analysis, adopts a GPU multi-core parallel platform for the high-speed measurement, extracts the useful information from the section image of the radial symmetrical cable, and then measures the insulating layer thickness. Compared with the prior art, the present patent can lower the time consumed for the accurate measurement, fill in the blank of the high-accuracy parallel image measurement of the insulating layer thickness of the radial symmetrical cable section in the domestic cable industry, break down the monopoly and technology block-
(Continued)

ade by related foreign manufacturers and improve the technology level of on-line testing of product quality in China, expedite the production automation progress of domestic manufacturer.

10 Claims, 2 Drawing Sheets

(58) Field of Classification Search
CPC ... C08K 3/04; C08K 5/01; C08K 5/14; H04N 5/372; H04N 5/142
See application file for complete search history.

(56) References Cited

U.S. PATENT DOCUMENTS 9,665,954 B2 * 5/2017 Liu ................. G06T 11/008
2012/0273253 A1 * 11/2012 Nilsson ................. C08F 6/001
  174/120 SC
2013/0168126 A1 * 7/2013 Kuchta ................. H01B 7/361
  174/102 SC
2014/0076609 A1 * 3/2014 Kim ..................... H01B 3/441
  174/120 SC
2016/0350960 A1 * 12/2016 Yi ......................... G06T 15/06

FOREIGN PATENT DOCUMENTS

| | | |
|---|---|---|
| CN | 102226687 | 10/2011 |
| CN | 102359761 | 2/2012 |
| CN | 103336959 | 10/2013 |
| CN | 204142186 | 2/2015 |
| CN | 105115428 | 12/2015 |
| JP | 2007115461 A * | 5/2007 |
| JP | 2009032516 | 2/2009 |

* cited by examiner

PARALLEL IMAGE MEASUREMENT METHOD ORIENTED TO THE INSULATING LAYER THICKNESS OF A RADIAL SYMMETRICAL CABLE SECTION

BACKGROUND OF THE INVENTION

Technical Field

The present invention relates to the field of machine vision industrial testing, especially relates to a parallel image measurement method oriented to the insulating layer thickness of a radial symmetrical cable section.

Description of Related Art

The industry of electrical wire and cable is the second largest industry next only to the automobile industry in mechanical manufacturing. It is estimated that as China will enter the later stage of industrialization in the next several years, the rate of development of the electrical wire and cable industry in China will be higher than that of the national economy, estimated to be over 10%, while the average annual increase for the electrical conductor and cable can be up to 15%. As the core of many power infrastructures, the cable determines the security and reliability of the whole power grid. Once the product quality deviation appears in the production line of a cable and fails to be timely adjusted, substantive defective products will be produced, leading to a lot of waste. Once the defective products enter the market, they will cause astronomically more power loss. Therefore the structure measurement of a cable is an essential link in product quality monitoring system, also serves as an important factor to guarantee the enterprises outperformance in the cut-throat market competition. The structural measurement of electric wire and cable has experienced the first-generation caliper, the second-generation micrometer reading microscope measurement and the third-generation digital projector. The traditional measurement methods can only measure limited points and local parts with a lot of missing points, thus making it hard to guarantee accuracy. Besides, the time consuming and laborious manual operations just produce unstable measurement effects that are significantly related to operators.

In recent years, the foreign advanced countries have introduced the high definition (HD) industrial camera, which is based on the industrial vision theory and technology to explore high-accuracy image measurement, with borderline products being put in commercial application gradually. However, the equipment is expensive and cannot be adjusted to the actual conditions of the domestic manufacturers. Market research displays an estimated total demand of more than 1,000 units, and similar foreign equipment is priced at 500,000-800,000 Yuan per unit. From the perspective of social value, an automatic optic inspection (AOI) system can operate continuously for long with a strong adaptability to the tough work environment, thus avoiding the negative influence from continuous high-strength work of the workers, thereby providing a guarantee for humanistic management of the enterprises. From the perspective of national interests, currently the Chinese AOI technology based on the computer vision has just started, with the main application fields of low speed and low precision such as character recognition, inspection of printing quality and product selecting, etc., while there is still dependence on the foreign products in high-precision and high-speed inspection, with costly purchase and maintenance expenses. Some home-made inspection systems based on the computer vision also adopt the core foreign technology. These products' key technologies such as system structure and core algorithm are still in the hands of foreign manufacturers, who often provide us with outdated technologies about to be washed out.

The commercially available cables have a lot of radial symmetrical sections. To eliminate the defects in the traditional measurement methods, the major technology problems encountered in the real-time calculation of the minimum thickness, the average thickness and the maximum thickness of insulating layer comprise:

(1) how to improve the measurement accuracy of the section image (2) how to improve the computing speed of the complicated image

BRIEF SUMMARY OF THE INVENTION

The purpose of the present invention is to provide a parallel image measurement method oriented to the insulating layer thickness of a radial symmetrical cable section to overcome the above defects of prior art. This method can help the cable quality inspectors to non-contact measure the insulating layer thickness of radial symmetrical cable section in real time during quality inspection, and can analyze and infer the problems existing in the production or processing of the cable by dint of measurement data.

The purpose of the present invention can be achieved by the following technical solution:

A parallel image measurement method oriented to the insulating layer thickness of a radial symmetrical cable section, characterized in that, the method conducts the non-contact high-accuracy measurement based on the machine vision and the image analysis, adopts a GPU multi-core parallel platform for the high-speed measurement, extracts the useful information from the section image of the radial symmetrical cable to measure insulating layer thickness.

Specifically, the method comprises the following steps:

1) reading an image shot, calibrated by an industrial CCD camera;

2) extracting an inner and an outer contour of the radial symmetrical cable section from the image, and calculating a mass center of the cable section;

3) subjecting the pixels in the inner contour to the sub-pixel pinpointing, connecting the mass center and the pixels of the inner contour and prolonging to the outer contour;

4) subjecting the outer contour to the piece-wise curve fitting, and solving a junction of the outer contour and an elongation line;

5) calculating the distance between the junction and the pixels of the inner contour, which will be the insulating layer thickness corresponding to the current pixels of the inner contour;

6) adopting a statistical method to obtain the maximum thickness, the minimum thickness and the average thickness of the insulating layer of this radial symmetrical cable section Realizing the B-spline curve fitting method based on a GPU multi-core parallel calculation platform, to realize pinpointing of the inner contour pixels and piecewise fitting of the outer contour.

Specifically, realizing B-spline curve fitting method based on the GPU multi-core parallel calculation platform is done by:

① starting a GPU, allocating space in a display memory and copying data to the display memory;

② defining the number of the blocks and the threads, spawning the threads, calling a kernel function, adopting the B-spline curve fitting to realize sub-pixels pinpointing of the inner contour points;

③ defining the number of the blocks and the threads, spawning the threads, calling the kernel function, calculating with the mass center, the points on the inner contour and the fitting function, to obtain the corresponding points on the outer contour;

④ the display memory and the GPU transfer the calculated results to a CPU, the resources on the display memory and the GPU are released.

Adopting the statistical method to obtain the maximum thickness, the minimum thickness and the average thickness of the insulating layer of this radial symmetrical cable section, looking for an appropriate value from all candidate thickness values as the final measured value to solve the maximum and the minimum values of the thickness, are not using a simple sorting algorithm. If an inner wall point corresponding to the thickness extrema is an active pixel, then there will exist heaps of similar active pixels around this pixel, making the neighboring thickness value an approximation of the thickness extrema.

The specific steps in solving the minimum thickness are as follows:

(1) sequencing the calculated thickness value of the insulating layer corresponding to each pixel of inner contour in an ascending order.

(2) taking N minimum values and the corresponding 2D co-ordinates, marking them as set Tn;

(3) for the ith minimal value, defining the weight $W_i=0$; if the point q adjacent to it in the image is in Tn, and the sequencing interval of the thickness does not exceed 10, then $W_i$++, and letting the adjacent points inactive in Tn;

(4) making the same operation for N minimum values in the ascending order. If $W_i$ is greater than a certain threshold, the current Ti is the minimum value.

The present invention contains the following benefits over the prior art

Firstly, with respect to characteristics of radial symmetrical cable section, this method uses the section image, offers a parallel measurement technology solution suitable for non-contact measurement and cuts the time consumed for the accurate measurement via the GPU multi-core parallel calculation platform.

Secondly, it pinpoints the pixels of the inner contour of cable through an analysis on the section image of the cable, adopts the B-spline curve fitting to piecewise fit the outer contour, thereby laying a foundation for the high-accuracy measurement.

Thirdly, it looks for an appropriate value from all the candidate thickness values measured as the last measurement value, thereby eliminating the influence of inactive pixels on the measurement accuracy.

DETAILED DESCRIPTION OF THE INVENTION

The present invention will now be described in detail in connection with an embodiment of the present invention with reference to the accompanying drawings.

Embodiment

Figure 1:
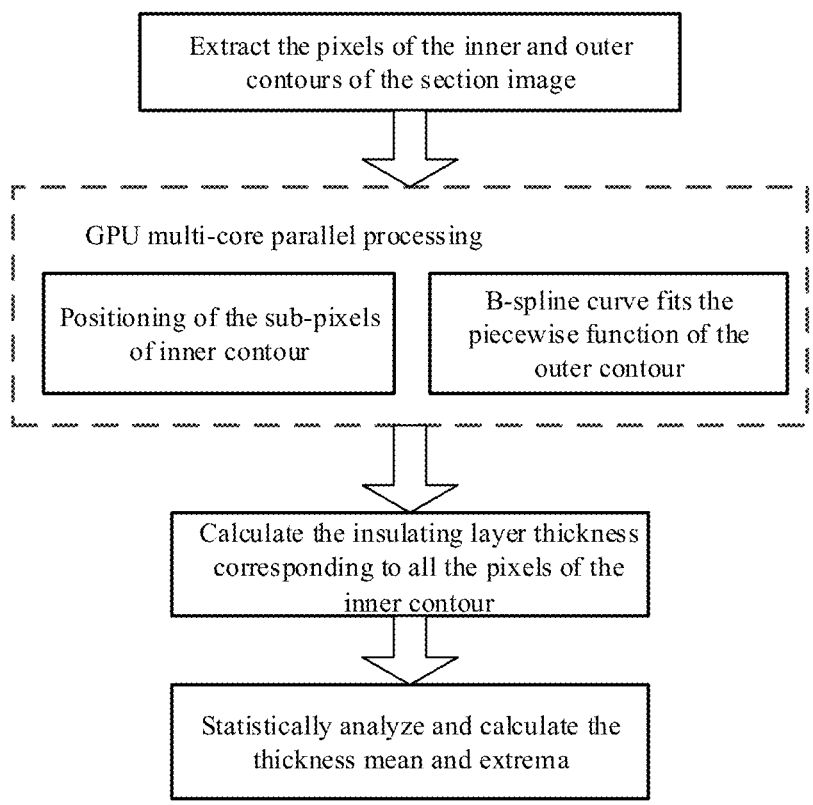
FIG. 1 is a technical line map of the present invention.

The difference from the existing measurement methods resides in that the present invention conducts the non-contact high-accuracy measurement based on the machine vision and the image analysis, adopts a GPU multi-core parallel platform for the high-speed measurement. It mainly considers how to extract the useful information from the section image of the radial symmetrical cable, and then measures the insulating layer thickness systematically, as shown in FIG. 1. The specific steps of the present invention are as follows:

① reading an image shot, calibrated by an industrial CCD camera;

② extracting an inner and an outer contour of a radial symmetrical cable section from the image, and calculating a mass center of the cable section;

③ subjecting the pixels of the inner contour to the sub-pixel pinpointing, connecting the mass center and the pixels of the inner contour and prolonging to the outer contour;

④ subjecting the outer contour to the piece-wise curve fitting and solving a junction of the outer contour and an elongation line;

⑤ calculating the distance between the junction and the pixels of the inner contour, which will be the insulating layer thickness corresponding to the current pixels of the inner contour;

⑥ adopting a statistical method to obtain the maximum thickness, the minimum thickness and the average thickness of the insulating layer of this radial symmetrical cable section The technology solution of the present invention is used by the quality inspectors of cable to obtain the measurement data of the insulating layer thickness via parallel calculation of the section image, specifically including the following:

1. Pinpointing of the pixels of the inner contour and piecewise fitting the outer contour based on a GPU platform (1) Rationale In consideration of the calculation capacity and performance of the hardware, a GPU parallel calculation model can be adopted to overcome the problems of too much time consumed and slow speed in the procedure of testing cable thickness, to enable a dramatic reduction of the time consumed in the testing procedure. The GPU (Graphics Processing Unit) is a highly parallel and multi-threading multi-core processor with a powerful computing capacity and a high band width. GPU parallel calculations can improve the performance of image processing dozens of times.

Figure 2:
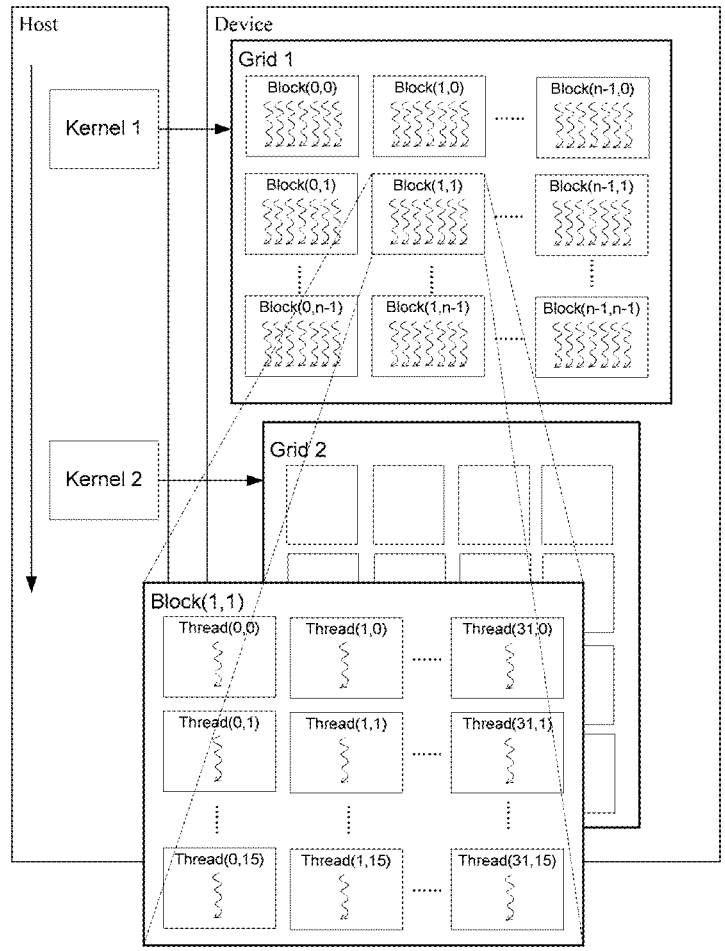
FIG. 2 is an organizational structure schematic diagram of the threads.

The CUDA is a soft hardware system with a GPU as the data parallel calculation equipment, developed by C language and easy for learning and use. A CPU serves as a host to do strongly logical tasks and serial computing. The GPU serves as a device to do highly threaded parallel processing tasks. Adopting a CPU+GPU isomerical parallel processing can significantly lower the burden to the CPU, decrease the CPU system overhead, raise the whole throughput of the system, improve the computing capacity of the system and economize on the cost and energy resources. A GPU parallel algorithm is adopted in the procedure of testing cable thickness to overcome the problems of too much time consumed and slow speed of calculation. The organizational structure of the threads is as shown in FIG. 2.

(2) Basic Steps

The B-spline curve fitting method can only target one certain pixel on the contour in each calculation, and the one calculated is a sub-pixel edge position of an individual pixel. The sub-pixel positioning of the edge entails calculating whole pixels on the contour one by one, with higher positioning accuracy yet relatively slow speed. Besides, as the image adopts a resolution of 4092*4092, the quantity of pixels on the inner and outer contours becomes very large and the calculation consumes a lot of time. Adopting the GPU parallel calculation model can considerably shorten the time consumed in this procedure. The main steps are as follows:

① starting the GPU, allocating space in a display memory and copying the data to the display memory;

② defining the number of the blocks and the threads, spawning the threads, calling a kernel function, adopting a B-spline curve fitting to realize sub-pixels pinpointing of contour points;

③ defining the number of the blocks and the threads, spawning the threads, calling the kernel function, calculating the mass center, the points on the inner contour and the fitting function, to obtain the corresponding points on the outer contour;

④ the display memory and GPU transfer the calculated results to the CPU and the resources on the display memory and GPU are released.

Mean and extrema calculation of insulating layer thickness based on the statistical method (1) Rationale Every cable section has an objective true value, and the most ideal measurement is to get this true value. However, the cable section is measured by humans using a CCD camera under certain illumination, which is limited by the sensitivity and the resolution capacity of the camera as well as the environmental instability, etc., hence the true value to be measured is immeasurable. Therefore, due to the natural limitation of accuracy and precision of the CCD camera, there are still residual inactive pixels even if the image is de-noised. The accuracy of the measured value will be influenced if the inactive pixel coincides with the inner wall point corresponding to the thickness extrema.

Thus an appropriate value should be selected from all candidate thickness values as the last measured value to solve the maximum value and the minimum value of the thickness, instead of using a simple sorting algorithm. If the inner wall point corresponding to the thickness extrema is an active pixel, then there will exist heaps of similar active pixels around this pixel, making the neighboring thickness value only an approximation of the thickness extrema.

(2) Basic Steps

Figure 3:
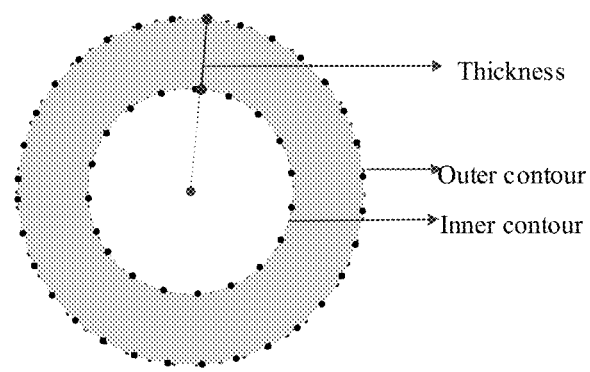
FIG. 3 is a schematic diagram of a cable section.

Calculate the maximum thickness, the minimum thickness and the average thickness of the insulating layer of the radial symmetrical cable section, i.e. select the appropriate value from all candidate thickness values as the last measured value. The schematic diagram of the radial symmetrical cable is as shown in FIG. 3. The specific steps of solving the minimum value of the insulating layer thickness include the following:

① sequencing the calculated thickness values of the insulating layer corresponding to each pixel of inner contour in an ascending order.

② taking N minimum values and corresponding 2D co-ordinates, marking them as set Tn;

③ for the ith minimal value, defining the weight $W_i=0$; if the point q adjacent to it (point distance smaller than 3) in the image is in Tn, and the sequencing interval of the thickness does not exceed 10, then $W_i$++, and letting the adjacent points inactive in TN;

④ making the same operation for N minimum values in the ascending order. If Wi is greater than a certain threshold, the current Ti is the minimum value.

The present invention enables real-time calculation of the minimum size, the maximum size and the average size of the insulating layer thickness after obtaining the image of the cable cross section scanned by an HD industrial camera in a full-coverage way. The present patent will fill in the blanks of the high-accuracy parallel image measurement of the insulating layer thickness of the radial symmetrical cable section in the domestic cable industry, break down the monopoly and technology blockade by the concerned foreign manufacturers and improve the technology level of on-line measurement of product quality in China. Furthermore, it can expedite the production automation progress of domestic manufacturers, economize a great deal on labor, financial resources and material resources. The potential application is wide and expandability is satisfactory. In addition, the technology can be further developed to be applied to high-accuracy image measurement of enamel wire structures.

What is claimed is:

1. A parallel image measurement method oriented to an insulating layer thickness of a radial symmetrical cable section, the method comprising:

an industrial CCD camera calibrating an image of the radial symmetrical cable section;

conducting a non-contact high-accuracy measurement based on a machine vision and image analysis;

a multi-thread multi-core processor performing a high-speed measurement;

obtaining information from the image of the radial symmetrical cable section; and measuring the insulating layer thickness;

wherein measuring the insulating layer thickness includes:

obtaining an inner and an outer contour of the radial symmetrical cable section from the image and calculating a mass center of the cable section;

pinpointing pixels of the inner contour to sub-pixels, connecting the mass center and the pixels of the inner contour and prolonging to the outer contour;

piece-wise curve fitting the outer contour, obtaining a junction of the outer contour and an elongation line;

obtaining a distance between the junction and the pixels of the inner contour, the distance being the insulating layer thickness corresponding to the pixels of the inner contour; and obtaining a maximum thickness, a minimum thickness, and an average thickness of the insulating layer of the radial symmetrical cable section.

2. The parallel image measurement method according to claim 1, wherein pinpointing the pixels of the inner contour and piece-wise curve fitting the outer contour are implemented by the multi-thread multi-core processor, the multi-thread multi-core processor implementing a B-spline curve fitting via parallel calculation.

3. The parallel image measurement method according to claim 2, wherein the multi-thread multi-core processor implementing the B-spline curve fitting includes:

① starting the multi-thread multi-core processor, allocating space in a display memory, and copying data to the display memory;
② defining a number of blocks and threads, spawning the threads, calling a kernel function, adopting the B-spline curve fitting to realize the pinpointing of the inner contour;
③ defining the number of the blocks and the threads, spawning the threads, calling the kernel function, and using the mass center, points on the inner contour and a fitting function to obtain corresponding points on the outer contour;
④ the display memory and the multi-thread multi-core processor transferring a calculated result to a CPU, and releasing resources on the display memory and the multi-thread multi-core processor.

4. The parallel image measurement method according to claim 1,
wherein a value is identified from all candidate values of thickness as a final measured value to obtain the maximum and the minimum thickness.

5. The parallel image measurement method according to claim 4,
wherein obtaining the minimum thickness comprises:
(1) sequencing the obtained thickness of the insulating layer corresponding to each of the pixels of the inner contour in an ascending order;
(2) taking N minimal values and corresponding 2D co-ordinates, marking the N minimal values and the 2D co-ordinates as set Tn;
(3) for an ith minimum value of the N minimal values, defining a weight $W_i=0$; if a point q adjacent to the ith minimum value in the image is in Tn, and a sequencing interval of the ordered thickness does not exceed 10, then $W_i$++, and inactivating the adjacent point in TN;
(4) performing steps (1)-(3) for all of the N minimum values in the ascending order, and if the $W_i$ is greater than a certain threshold, a current $T_i$ is the minimum thickness.

6. A parallel image measurement system for an insulating layer thickness of a radial symmetrical cable section, the system comprising:
an industrial CCD camera, the camera is configured to calibrate an image of the radial symmetrical cable section;
a CPU; and
a multi-thread multi-core processor,
wherein the CPU and the multi-thread multi-core processor are configured to
conduct a non-contact high-accuracy measurement based on a machine vision and image analysis;
perform a high-speed measurement;
obtain information from the image of the radial symmetrical cable section; and
measure the insulating layer thickness,
wherein when the CPU and the multi-thread multi-core processor measure the insulating layer thickness, the CPU and the multi-thread multi-core processor are further configured to:
obtain an inner and an outer contour of the radial symmetrical cable section from the image and calculate a mass center of the cable section;
pinpoint pixels of the inner contour to sub-pixels, connect the mass center and the pixels of the inner contour and prolong to the outer contour;
piece-wise curve fit the outer contour, obtain a junction of the outer contour and an elongation line;
obtain a distance between the junction and the pixels of the inner contour, the distance being the insulating layer thickness corresponding to the pixels of the inner contour; and
obtain a maximum thickness, a minimum thickness, and an average thickness of the insulating layer of the radial symmetrical cable section.

7. The parallel image measurement system of claim 6, wherein the multi-thread multi-core processor is configured to pinpoint the pixels of the inner contour and piece-wise curve fit the outer contour, and
the multi-thread multi-core processor is configured to implement a B-spline curve fitting via parallel calculation.

8. The parallel image measurement system of claim 7, further comprising:
a display memory,
wherein when the multi-thread multi-core processor implements the B-spline curve fitting, the multi-thread multi-core processor is started, and the multi-thread multi-core processor and the display memory are configured to:
allocate space in the display memory and copy data to the display memory;
define a number of blocks and threads, spawn the threads, call a kernel function, adopt the B-spline curve fitting to pinpoint the inner contour;
define the number of the blocks and the threads, spawn the threads, call the kernel function, and use the mass center, points on the inner contour, and a fitting function to obtain corresponding points on the outer contour; and
transfer a calculated result to the CPU, and release resources on the display memory and the multi-thread multi-core processor.

9. The parallel image measurement system of claim 6, wherein the CPU and the multi-thread multi-core processor are configured to identify a value from all candidate values of thickness as a final measured value to obtain the maximum and the minimum thickness.

10. The parallel image measurement system of claim 9, wherein when the CPU and the multi-thread multi-core processor obtain the minimum thickness, the CPU and the multi-thread multi-core processor are configured to:
(1) sequence the obtained thickness of the insulating layer corresponding to each of the pixels of the inner contour in an ascending order;
(2) take N minimal values and corresponding 2D co-ordinates, mark the N minimal values and the 2D co-ordinates as set Tn;
(3) for an ith minimum value of the N minimal values, define a weight $W_i=0$; if a point q adjacent to the ith minimum value in the image is in Tn, and a sequencing interval of the ordered thickness does not exceed 10, then $W_i$++, and inactivate the adjacent point in TN;
(4) perform (1)-(3) for all of the N minimum values in the ascending order, and if the $W_i$ is greater than a certain threshold, a current $T_i$ is the minimum thickness.

* * * * *